Patented Jan. 6, 1931

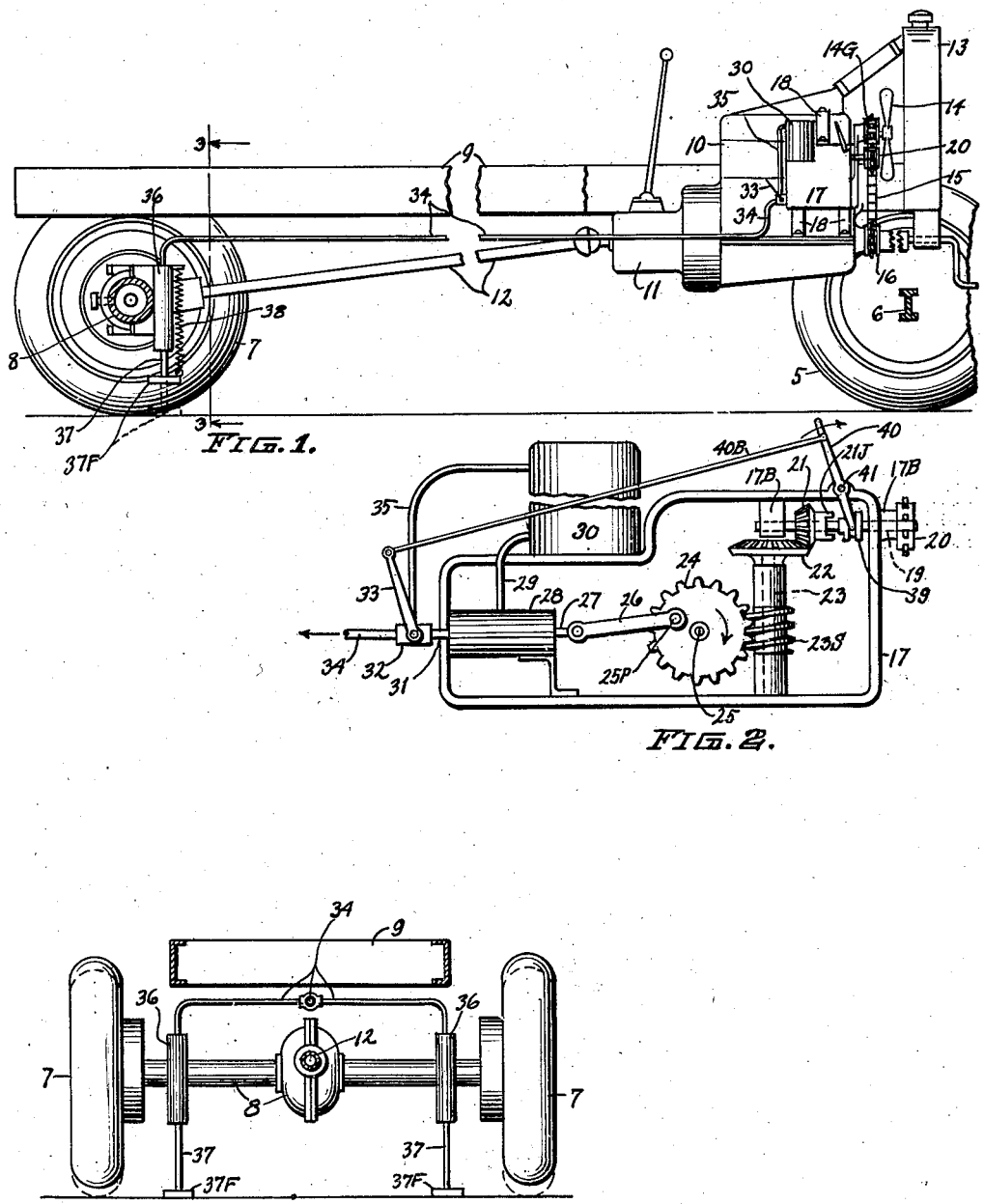

1,788,027

UNITED STATES PATENT OFFICE

FRANK J. MAY, OF ST. PAUL, MINNESOTA

HYDRAULIC JACK

Application filed March 27, 1929. Serial No. 350,400.

My invention relates to a hydraulic hoist device particularly adapted for use on motor vehicles and the main object is to provide a simple, efficient and reliable hoist operable selectively to lift either axle of a vehicle, power for its operation being utilized from the vehicle motor. The following specification fully discloses the operation and construction of my device, reference being had to the accompanying drawing illustrating the device in a preferred form and in which,—

Fig. 1 is a longitudinal sectional side elevation of a motor vehicle with my improved hydraulic device in operative position, the section being in a vertical plane at right side of the vehicle frame and omitting the right hand ground wheels.

Fig. 2 is an enlarged side elevation of the pump means and adjacent parts of my device, with frame cover removed, to expose the mechanism.

Fig. 3 is a transverse sectional elevation looking toward the rear axle of a vehicle having my improved hydraulic jack members, as seen from the vertical plane indicated by line 3—3 in Fig. 1.

Referring to the drawing by reference numerals I have illustrated a truck-chassis including front wheels 5, front axle 6, rear wheels 7, rear axle 8, frame 9 and a motor 10, with transmission 11, the main drive shaft 12 to rear axle and the usual radiator 13, all in approximately correct relative positions and assembly in the usual motor truck construction. 14 is the usual draft fan mounted forward of the motor and driven by a pulley or gear 14G in turn driven by a chain 15 which engages a power-gear 16 on the crank shaft of the motor (see Fig. 1).

My device comprises a suitable pump housing 17 suitably mounted as with brackets 18 to adjacent fixed parts of the motor, said housing having horizontally spaced integral bearings 17B bored for a primary drive shaft 19 carrying, exteriorly of the housing, a drive sprocket 20 arranged to be engaged by the fan drive chain 15 (see Fig. 1).

Interiorly of the housing shaft 19 is provided with a bevel pinion 21 meshing with a bevel gear 22 keyed on a shaft 23 suitably mounted and said shaft 23 comprising further a worm screw 23S engaging a gear 24 also mounted within the housing on a shaft 25. Said gear has a crank pin 25P engaged by one end of a connecting rod 26, the other end of which connects with a piston rod 27 reciprocable in a pump cylinder 28 (see Fig. 2) having an intake pipe 29 leading from a suitable reservoir 30. Said cylinder has an outlet pipe 31 with a three way valve 32 having a lever 33 to regulate flow of oil or any other liquid used. For example, when oil is pumped from reservoir 30 to pipe 31 it may be allowed to circulate directly through a pipe 34 to my hydraulic jack means, or when the pumping is completed the oil may be allowed to return through pipe 34 valve 32 and a by-pass pipe 35 back to reservoir 30.

My lifting jack means comprises preferably two upright cylinders 36 for each axle, one near each wheel, but illustrated in Figs. 1 and 3 on the rear axle only. Each cylinder is suitably fixed rigid to the axle, and the upper end having an intake port for pipe 34, the lower end bored for guiding a piston rod 37 with a piston inside the bore (not shown) and on its lower end a foot piece 37F.

38 is a tension coil spring with one end fixed to the upper part of cylinder 36 (see Fig. 1) and its lower end fixed to the foot piece 37F, the tension in the spring normally holding the piston rod in upper position with its foot piece in spaced relation to the ground, assuming there is no pressure in the pipe line 34.

When it is desired to raise a truck axle for the purpose of getting its wheels off the ground and facilitate tire repairs or other work under the truck, it will be readily seen that liquid is pumped through pipe 34 to the hoist jacks 36 pressing the pistons therein downwardly until the foot pieces 37F are pushed down far enough to raise the axle. When the axle is raised as far as desired power is turned off and the axle will remain in said position until it is desired to lower the axle again. Then valve 32 is opened to permit the oil in pipe line 34 to flow back through pipe 35 to the reservoir and when pressure is thus reduced the coil spring 38 automatically retracts and pulls up the foot piece.

Obviously it is necessary to make provision for regulating pump action without stopping the motor and this may be done in various ways. I have illustrated drive pinion 21 as loose on the shaft and having its hub formed with jaw members 21J arranged to be engaged by a slidable keyed jaw clutch 39 on shaft 19 and engaged by a lever 40 pivoted at 41 and projecting above the housing 17.

This lever 40 may be directly connected to lever 33 of the valve 32 by a bar 40B (Fig. 2) in such a way that when the clutch members are connected to cause the pump to work the valve 32 permits direct flow of oil or other liquid from pipe 31 through pipe 34 to the hydraulic jacks described. Movement of lever 40 a predetermined distance disengages the jaw clutch but does not permit oil to back flow but causes cessation of the pump action. A still further movement of lever 40 moves lever 33 to permit said back flow of oil. Obviously levers 40 and 33 may be operated independently by omitting bar 40B, and further, bar 40 may have any suitable operating connection (not shown) within reach of the truck driver.

It is clear that the gear reductions or train gears as 21, 22, 23S and 24 may be varied as conditions may necessitate, such as power available and amount of hydraulic pressure needed, so as not to cause too great a strain on the relatively small operating parts in the housing 17. Proportions of parts too may be varied greatly for obvious reasons but not necessarily departing from the scope and spirit of my invention.

Suitable control means in the pipe line 34 may be incorporated to selectively direct pressure to any one or pair of the lifting jacks. For example, a valve may be used to direct pressure to either or both of the jacks as illustrated in Fig. 3. Thus any wheel may be raised for repairs.

I claim:

A hydraulic pump for motor vehicles provided with hydraulic jacks of the class described and pipe means from said pump to each jack, a liquid reservoir; the motor of said vehicle provided with a belt driven fan; said pump comprising a mechanism housing adapted to be mounted on a vehicle motor, a primary pump drive pinion exteriorly of the housing and mounted on a drive shaft journaled in the housing, a bevel pinion on said shaft, a reciprocating plunger type liquid pump within the housing, transmission means intermediate said bevel pinion and the plunger of the pump to reciprocate the latter when the drive pinion is rotated, said drive pinion arranged to be engaged by the fan belt of the motor, clutch means keyed on said drive shaft and operative to selectively cause action or inaction of the pump.

In testimony whereof I affix my signature.

FRANK J. MAY.